United States Patent
Nakaishi et al.

(10) Patent No.: US 9,017,869 B2
(45) Date of Patent: Apr. 28, 2015

(54) CELL STACK FOR REDOX FLOW BATTERY

(75) Inventors: Hiroyuki Nakaishi, Osaka (JP); Takashi Kanno, Osaka (JP); Seiji Ogino, Osaka (JP); Takefumi Ito, Osaka (JP); Toshio Shigematsu, Osaka (JP); Nobuyuki Tokuda, Osaka (JP)

(73) Assignees: Sumitomo Electric Industries, Ltd., Osaka (JP); The Kansai Electric Power Co., Inc., Osaka (JP)

( * ) Notice: Subject to any disclaimer, the term of this patent is extended or adjusted under 35 U.S.C. 154(b) by 1163 days.

(21) Appl. No.: 10/480,299

(22) PCT Filed: May 7, 2002

(86) PCT No.: PCT/JP02/04444
§ 371 (c)(1), (2), (4) Date: Jul. 19, 2004

(87) PCT Pub. No.: WO02/101863
PCT Pub. Date: Dec. 19, 2002

(65) Prior Publication Data
US 2004/0241544 A1 Dec. 2, 2004

(30) Foreign Application Priority Data
Jun. 12, 2001 (JP) ................................. 2001-177240

(51) Int. Cl.
*H01M 8/18* (2006.01)
*H01M 8/02* (2006.01)
*H01M 8/24* (2006.01)

(52) U.S. Cl.
CPC ............ *H01M 8/0273* (2013.01); *H01M 8/242* (2013.01); *H01M 8/0247* (2013.01); *H01M 8/188* (2013.01); *H01M 8/248* (2013.01); *Y02E 60/528* (2013.01)

(58) Field of Classification Search
CPC ..................................................... H01M 8/0273
USPC ........................................ 429/507, 508, 511
See application file for complete search history.

(56) References Cited

U.S. PATENT DOCUMENTS 4,615,107 A * 10/1986 Kumeta et al. ............... 29/623.1
5,618,641 A *  4/1997 Arias ............................. 429/210

FOREIGN PATENT DOCUMENTS

| EP | 1 059 685 A2 | 12/2000 |
| JP | 63-40261 | 2/1988 |

(Continued)

OTHER PUBLICATIONS

IPDL JPO Machine Translation of JP Publication No. 07-135008 (1995).*

(Continued)

*Primary Examiner* — Maria J Laios
(74) *Attorney, Agent, or Firm* — McDermott Will & Emery LLP

(57) ABSTRACT

This invention provides a cell stack for a redox flow battery that can provide battery efficiencies with high reliability over a long term, without any adhesive bonding between a bipolar plate and electrodes. In the cell stack 1 for the redox flow battery of a cell frame 2, electrodes 3, 4 and a membrane 5 being stacked in layers, the cell frame 2 comprises a frame 2A and a bipolar plate 9 arranged inside of the frame 2A, and the electrodes 3, 4 are put into close contact with the bipolar plate 9 by a clamping force, without being adhesively bonded to the bipolar plate 9. It is preferable that when the electrodes 3, 4 are compressed to a thickness corresponding to a level difference between the frame 2A and the bipolar plate 9, repulsive force of the electrodes is in the range of more than 15 kPa to less than 150 kPa (more than 0.153 kgf/cm$^2$ to less than 1.53 kgf/cm$^2$).

9 Claims, 6 Drawing Sheets

(56) References Cited

FOREIGN PATENT DOCUMENTS

| | | | | | |
|---|---|---|---|---|---|
| JP | 02-183968 | * | 7/1990 | ............. | H01M 8/24 |
| JP | 3-119665 | | 5/1991 | | |
| JP | 6-7157 | | 1/1994 | | |
| JP | 06-007157 | * | 1/1994 | ............. | H01M 8/02 |
| JP | 7-135008 | | 5/1995 | | |
| JP | 8-7913 | | 1/1996 | | |
| JP | 2000-67899 A | | 3/2000 | | |
| JP | 3143613 | | 12/2000 | | |
| JP | 2001-6690 A | | 1/2001 | | |
| JP | 2001-6691 A | | 1/2001 | | |

OTHER PUBLICATIONS

IPDL JPO Machine Translation of JP Publication No. 2001-006690 (2001).*

IPDL JPO Machine Translation of JP Publication No. 2000-067899 (2000).*

IPDL Machine Translation of JP 06-007157.*

IPDL Machine Translation of JP 06-007157. Printed Oct. 2007.*

European Search Report issued in European Patent Application No. 02724708.9-2119, mailed Aug. 26, 2009.

* cited by examiner

CELL STACK FOR REDOX FLOW BATTERY

TECHNICAL FIELD

The present invention relates to a cell stack for a redox flow battery. Particularly, the present invention relates to a cell stack possessing high reliability and simple structure.

BACKGROUND ART

Referring to FIG. 5, there is shown an explanatory view showing an operating principle of a conventional redox flow secondary battery. The redox flow battery has a cell 100 separated into a positive electrode cell 100A and a negative electrode cell 100B by a membrane 103 that can allow ions to pass through. The positive electrode cell 100A and the negative electrode cell 100B include a positive electrode 104 and a negative electrode 105, respectively. A positive electrode tank 101 for feeding and discharging positive electrolytic solution to and from the positive electrode cell 100A is connected to the positive electrode cell 100A through conduit pipes 106, 107. Similarly, a negative electrode tank 102 for feeding and discharging negative electrolytic solution to and from the negative electrode cell 100B is connected to the negative electrode cell 100B through conduit pipes 109, 110. Aqueous solution containing ions that change in valence, such as vanadium ion, is used for the positive and negative electrolytes. The electrolyte containing the ions is circulated by using pumps 108, 111, to charge and discharge with the change in ionic valence at the positive and negative electrodes 104, 105.

Referring to FIG. 6, there is shown a diagrammatic illustration of construction of a cell stack used for the redox flow battery mentioned above. This type of battery usually uses the construction which is called a cell stack 200 comprising a plurality of cells stacked in layers. Each cell comprises the positive electrode 104 made of carbon felt and the negative electrode 105 made of carbon felt arranged at both sides of the membrane 103. Cell frames 210 are arranged at the outside of the positive electrode 104 and at the outside of the negative electrode 105, respectively.

Each of the cell frames 210 comprises frames 212 made of plastic and a bipolar plate 211 made of a plastic carbon fixed in between the frames 212. The positive electrode 104 and the negative electrode 105 are adhesively bonded to the bipolar plate 211.

End plates 201 are arranged at both sides of the stack body comprising the cell frames 210 and the electrodes 104, 105 and are clamped onto the both sides of the stack body by tightening nuts 203 screwed on rod-like members 202 piercing both end plates 201. The end plate 201 commonly used comprises a rectangular plate 201A reinforced by a latticed frame 201B integrally formed on the rectangular plate 201A.

However, the conventional cell stack 200 involves the adhesively bonding of the positive electrode 104 and the negative electrode 105 to the bipolar plate 211, leading to increase in the fabrication process.

In addition, the bonding of the bipolar plate 211 to the electrodes 104, 105 by adhesive involves the disadvantage that due to deterioration of the adhesive, there is the possibility that the electrodes 104, 105 may peel off from the bipolar plate 211. This results in increase in electrical internal resistance of the battery, providing the problem of causing reduction of the battery efficiencies.

Accordingly, it is a primary object of the present invention to provide a cell stack for a redox flow battery that can maintain its reliability over a long term without adhesively bonding the bipolar plate to the electrodes.

DISCLOSURE OF THE INVENTION

The present invention provides a novel cell stack for a redox flow battery of a cell frame, electrodes and a membrane being stacked in layers, wherein the cell frame comprises a frame and a bipolar plate integrated with the frame, and the electrodes are put into close contact with the bipolar plate by a clamping force, without being adhesively bonded to the bipolar plate.

This arrangement, which can allow the stacked state of the a cell frame and electrodes to be held by a clamping force only, can eliminate the adhesive bonding process of the bipolar plate and electrodes, thus achieving reduction of assembly processes. Also, the elimination of the adhesive bonding process can also eliminate the problem of deterioration in battery efficiency with deterioration of adhesive. The electrodes defined herein indicate a positive electrode and a negative electrode.

When the cell stack is held by the clamping force only, a large clamping force is exerted on the components of the cell stack. The constructions desirable for holding the cell stack by the clamping force only are described below.

① When the electrodes are compressed to thickness corresponding to a level difference between the frame and the bipolar plate, repulsive force of the electrodes is set to be in the range of more than 15 kPa to less than 150 kPa (more than 0.153 kgf/cm$^2$ to less than 1.53 kgf/cm$^2$).

When the cell stack is held in assembled relation by the clamping force, the electrodes are put into the compressed state in the cell stack. By defining the repulsive force of the electrodes for the compression of the electrodes, the cell stack can effectively provide its function as the battery. When the repulsive force is below the lower limit defined above, it is difficult to hold an appropriate contact resistance between the electrodes and the bipolar plate. On the other hand, when the repulsive force is in excess of the upper limit defined above, there is the possibility that a smooth circulation of the electrolyte that permeates to the electrodes may be hindered. Further preferably, the repulsive force of the electrodes is in a limited range of 40 kPa or more to 100 kPa or less (0.408 kgf/cm$^2$ or more to 1.02 kgf/cm$^2$ or less), out of the range specified above.

② The electrodes are each formed to have a weight per unit area of 100 g/m$^2$ or more to less than 1,200 g/m$^2$.

It is preferable that the weight per unit area of the electrode is less than 1,200 g/m$^2$. It is particularly preferable that the weight per unit area of the electrode is in the range of 100 g/m$^2$ or more to 1,000 g/m$^2$ or less. When the weight per unit area of the electrode is below the lower limit defined above, it is difficult to hold an appropriate contact resistance between the electrodes and the bipolar plate. On the other hand, when the weight per unit area of the electrode is over the upper limit defined above, the reaction area of the electrode increases, so that there is the possibility that a smooth circulation of the electrolyte that permeates to the electrodes may be hindered. Further preferably, the weight per unit area of the electrode is in a limited range of 250 g/m$^2$ or more to 800 g/m$^2$ or less, out of the range specified above.

③ The cell stack comprises end plates arranged at both ends thereof and a clamping mechanism for holding the cell frames and the electrodes in sandwich relation between both end plates, and the end plates are in the form of a latticed plate having empty spaces therein.

The conventional end plate commonly used comprises a rectangular plate reinforced by a latticed frame integrally formed on the rectangular plate. This construction of the end plate incurs increase in its own weight, causing increase in weight of the cell stack.

In the present invention, the end plates are each formed by only a latticed plate having empty spaces therein, without using the rectangular plate of the conventional end plate, thereby achieving reduction in weight of the end plate.

④ The cell stack includes end plates arranged at both ends thereof and a clamping mechanism for holding the cell frames and the electrodes in sandwich relation between the both end plates, and the clamping mechanism comprises rod-like members extending through the end plates and nuts screwed on ends of the rod-like members to tighten the both end plates.

By clamping the end plates by using the rod-like members and the nuts, the stacked state of the cell frame and the electrodes can be reliably held in its stacked state. Also, the clamping force of the cell stack can be adjusted with ease by adjusting the nuts screwed on the bolts.

⑤ The clamping mechanism of the cell stack includes elastic members for absorbing expansion and contraction of the cell stack in a direction of the cell frame and the electrodes being stacked in layers.

The cell stack is expanded and contracted by heat generation during the charge and discharge of electricity. This expansion and contraction of the cell stack is absorbed by the elastic members, and as such can allow the cell stack to be held with an adequate clamping force, irrespective of the expanded and contracted state of the cell stack.

A spring is preferably used as the elastic member. In particular, a helical compression spring is most suitable. The coil spring having a suitable spring constant for absorbing the thermal expansion and contraction can be properly selected in accordance with the size of the cell frame, the number of cell frames stacked, and the number of rod-like members used for the clamping mechanism. The elastic members are preferably disposed around the outside of the rod-like members between the nuts of the clamping mechanism and the end plates.

⑥ When the rod-like members are used for the clamping mechanism, the rod-like members are provided with insulating coatings.

An outer edge of the membrane sandwiched between the cell frames is sometimes slightly exposed from an outer edge of the cell frames. The membrane is impregnated with electrolyte. If the rod-like members contact with the membrane exposed from the outer edge of the cell frames, electrical continuity will be incurred therebetween. Accordingly, the rod-like members placed in the vicinity of the outer edge of the cell frames are also provided with insulating coatings, to prevent incurrence of electrical continuity through the rod-like members.

No particular limitation is imposed on material and structure of the insulating coating, as long as it can withstand voltage of the cell stack. The insulating coatings that may be used, for example, a coating by a thermal contraction tube, a coating by insulating painting, or a coating by extrusion. Usually, the insulating coating used is just required to withstand a voltage of the order of 200V.

⑦ The out-of-position preventing member of the cell frame is interposed between "a stack body comprising the cell frames and the electrodes" and "the rod-like members of the clamping mechanism".

In the cell stack designed to hold the cell frames by the clamping force only, when some impact is exerted on the cell stack during transportation, the cell frame at a central portion of the cell stack in particular may be displaced downwardly from the original position. For preventing this out-of-position of the cell frame, the out-of-position preventing member of the cell frame is interposed between "a stack body comprising the cell frame and the electrodes" and "the rod-like members of the clamping mechanism".

The rod-like members themselves may double as the out-of-position preventing function by placing the rod-like members in contact with the cell frames, without using the out-of-position preventing member. But, in this case, there is no substantial clearance between the rod-like members and the cell frames, so that it is practically hard to assemble the cell stack. In contrast to this, the out-of-position preventing member provided separately from the rod-like members does not adversely affect the workability in assembling the cell stack.

A plate-like member having a thickness corresponding to a distance between the rod-like members and the cell frames can preferably be used as the out-of-position preventing member. Since the out-of-position preventing member is placed in contact with the rod-like members, if the rod-like members do not have any insulating coating, then the out-of-position preventing member itself should preferably be formed of insulating material or the insulating coating should preferably be formed on the conductive out-of-position preventing member.

BEST MODE FOR CARRYING OUT THE INVENTION

In the following, certain preferred embodiments of the present invention are described.
(Overall Construction)

Figure 1:
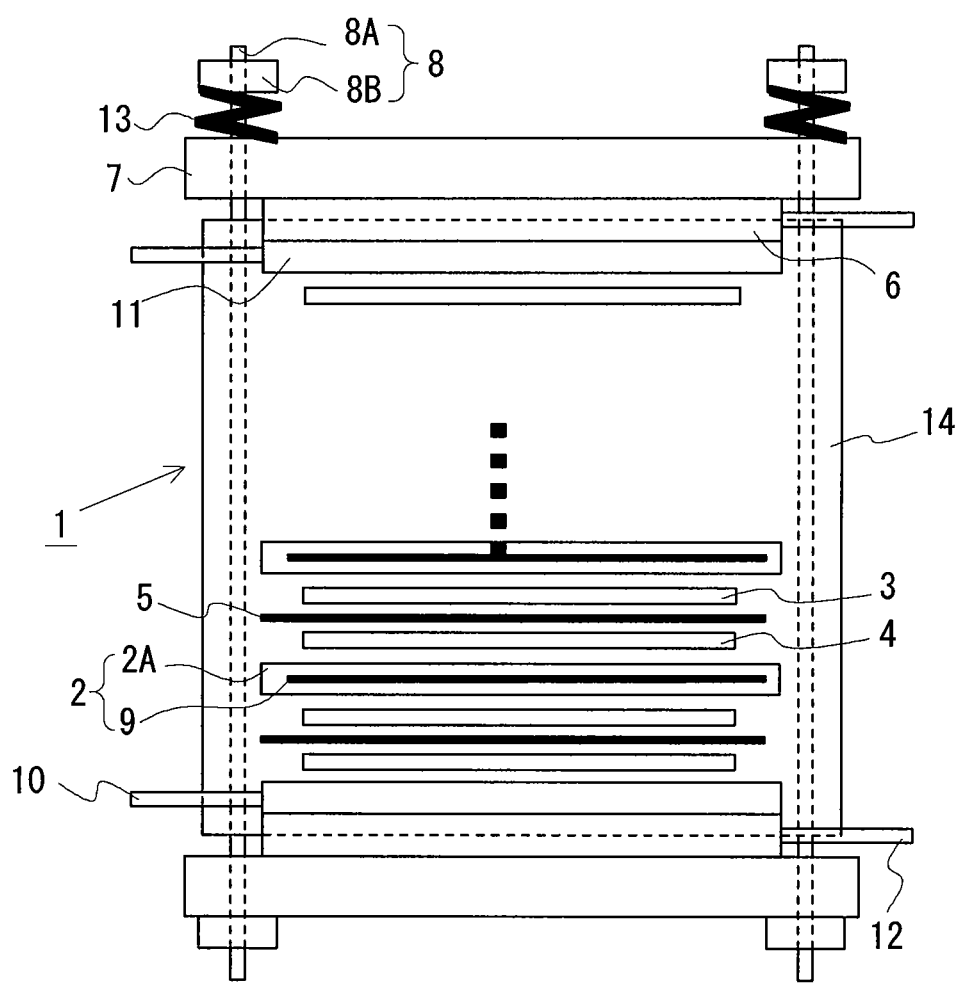
FIG. 1 is a diagrammatic illustration of construction of a cell stack of the present invention.
Figure 5:
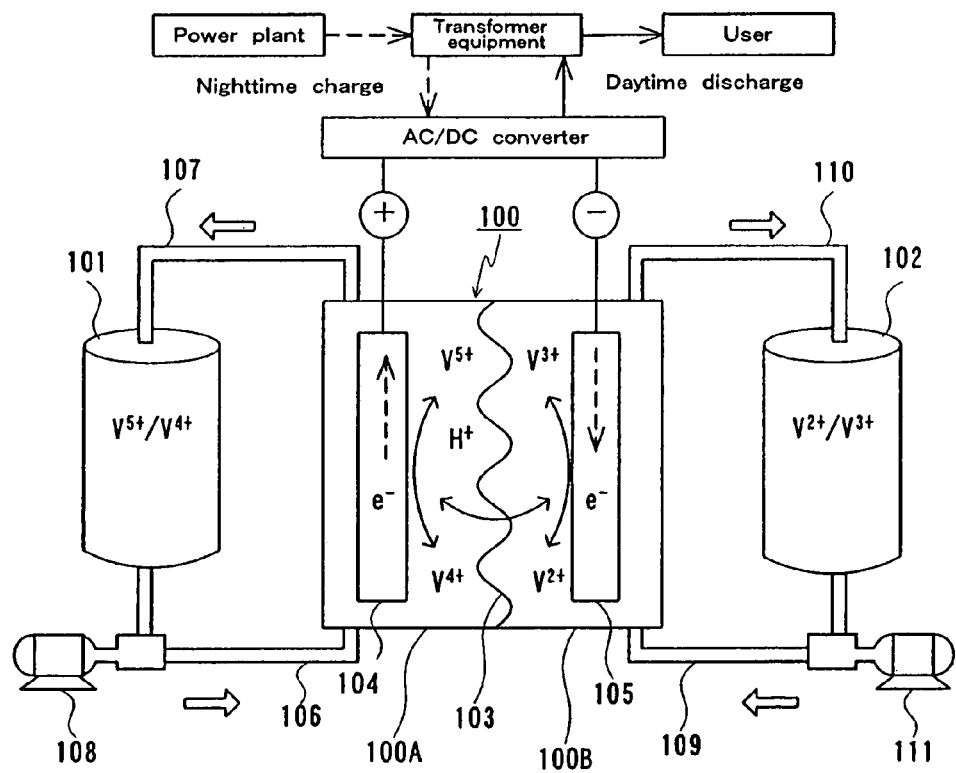
FIG. 5 is an explanatory view of an operating principle of the redox flow battery.
Figure 6:
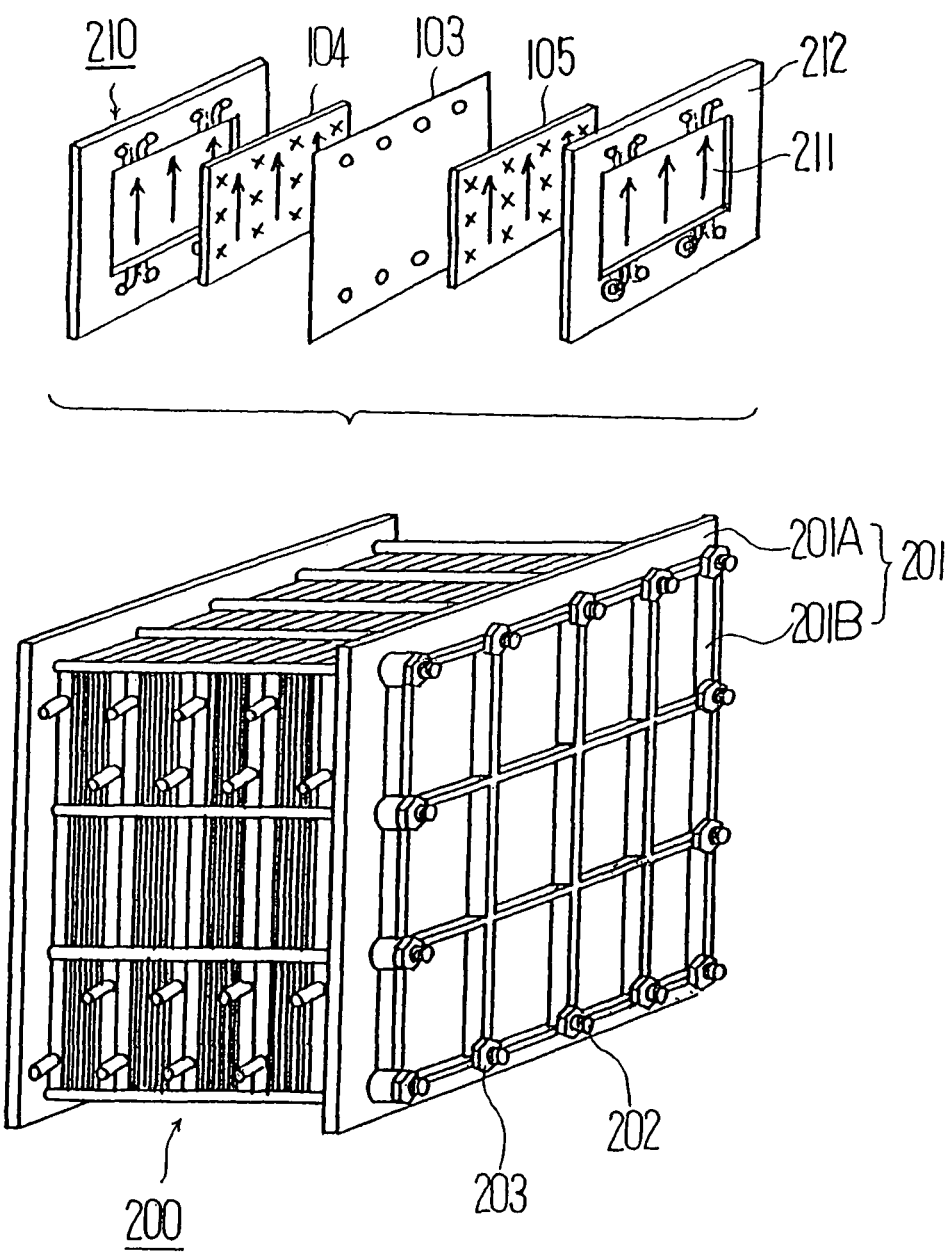
FIG. 6 is an illustration of a conventional cell stack.

Referring to FIG. 1, there is shown a diagrammatic illustration of construction of a cell stack of the present invention, when viewed from the top. As illustrated, the cell stack 1 has the construction wherein cell frames 2, electrodes 3, 4 and membranes 5 are stacked in layers to form a stack body and also feed/discharge plates 6 and end plates 7 are arranged at both ends of the stack body and are clamped onto both sides of the stack body by a clamping mechanism 8. An out-of-position preventing plate 14 is provided at a lower surface of the stack body. An operating principle of a redox flow battery using the cell stack 1 is the same as that outlined with reference to FIG. 5. The electrolytes are circulated from tanks to the positive electrode 3 and the negative electrode 4, respectively, as in the same manner as conventional. The cell stack 1 is installed on the ground via a support base, not illustrated. The support base may be formed by an insulator set to isolate the cell stack from the ground.
(Cell Frame)

The cell frame 2 comprises a frame 2A and a bipolar plate 9 fixed on an inside of the frame.

The frame 2A is a frame member formed of plastic comprising vinyl chloride. On the other hand, the bipolar plate 9 is a rectangular plate formed of conductive plastic carbon containing graphite. There are two methods of integrating the frame 2A and the bipolar plate 9. ①One method is that two frame members produced in an injection molding and the like are prepared and joined together to form the frame 2A and also an outer periphery of the bipolar plate 9 is sandwiched between inner peripheries of the both frame members. ② Another one is that the frame is formed in the injection molding using the bipolar plate 9 as a core. In this embodiment, the cell frame 2 is formed by the former method.

Figure 2:
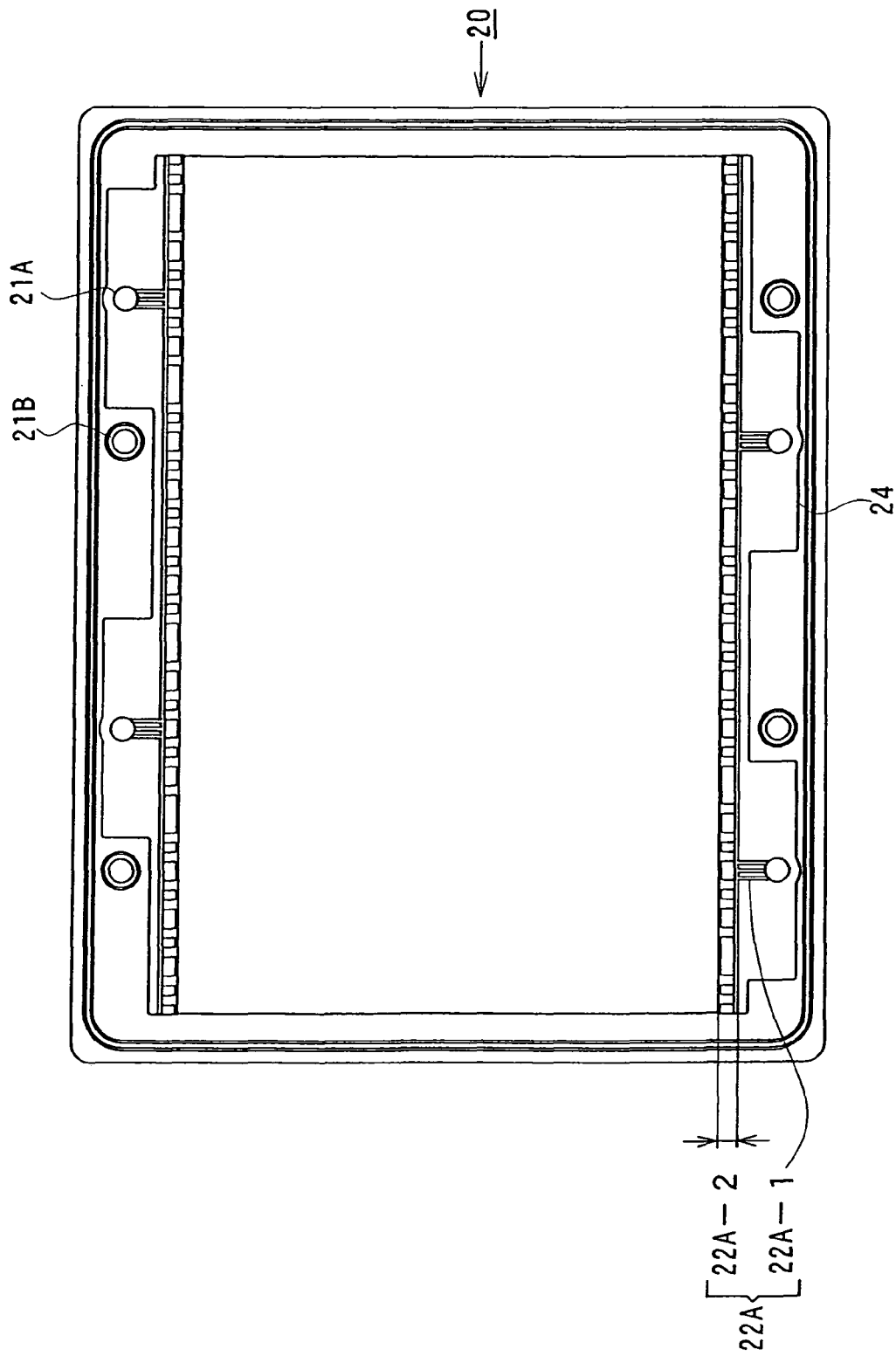
FIG. 2 is a plan view of a frame member used for the cell stack of the present invention.

Referring to FIG. 2, there is shown a plan view of the frame member. The frame member 20 has a plurality of manifolds 21A, 21B formed in its long sides. The manifolds 21A, 21B are arranged to form flow channels of the electrolytic solutions extending in a stacking direction of the cell frames when a number of cell frames are stacked in layers. In the illustrated embodiment, the manifolds arranged along the long side of the frame member 20 are alternately used as a positive electrolyte manifold 21A and a negative electrolyte manifold 21B.

The frame member 20 has, on a front side thereof, a circulation portion 22A of the electrolyte. The circulation portion 22A comprises an electrolyte guide groove 22A-1 extending from the manifold 21A and a rectifying portion 22A-2 for allowing the electrolyte fed from the guide groove 22A-1 to diffuse along an edge of the positive electrode. The rectifying portion 22A-2 is formed by rectangular projections and depressions formed along the long side of the frame member 20. The electrolyte is guided to the positive (negative) electrode through the depressions. The number and shape of the guide groove 22A-1 and of the rectifying portion 22A-2 are not limited to those illustrated in this embodiment.

The guide groove 22A-1 in one long side of the frame member 20 and the guide groove 22A-1 in the other long side thereof are arranged to be symmetrical with respect to a point. This arrangement can provide the advantage that the frame members 20 can all be formed into the same configuration or there is no need to prepare the frame members 20 having different configurations, because they can be combined with each other by simply changing orientation.

Figure 3:
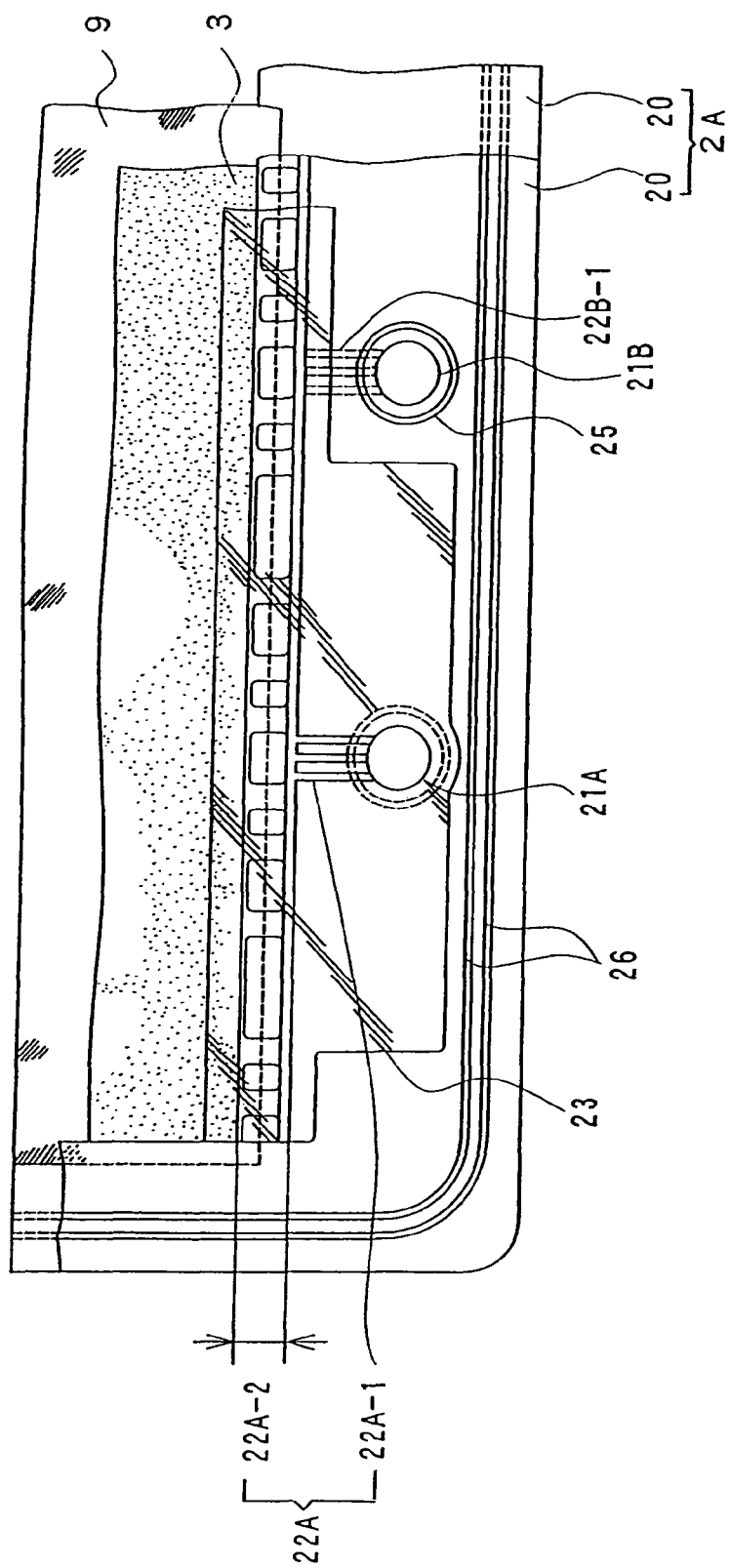
FIG. 3 is a plan view showing a combined state of the cell frame and electrodes used for the cell stack of the present invention.

Shown in FIG. 3 is a partial plan view showing the state in which the electrodes and a protection plate are arranged in the cell frame formed by joining the frame members together.

In FIG. 3, the guide groove 22A-1 depicted by a solid line is formed on a front side of the frame 2A and the guide groove 22B-1 depicted by a broken line is formed on a back side of the frame 2A. In the illustration, the manifold on the left is the positive electrolyte manifold 21A. The positive electrolyte passing through the guide groove 22A-1 indicated by the solid line from this positive electrolyte manifold is guided to the positive electrode 3 disposed on the front side of the bipolar plate 9. On the other hand, the manifold on the right is the negative electrolyte manifold 21B. The negative electrolyte passing through the guide groove 22B-1 indicated by the broken line from this negative electrolyte manifold is guided to the negative electrode (not shown) disposed on the back side of the bipolar plate 9.

The guide groove 22A-1 and the rectifying portion 22A-2 are covered with a plastic protection plate 23. The protection plate 23 has a circular hole formed in a position corresponding to the manifold 21A and also has a size to cover an entire area of the guide groove 22A-1 and the rectifying portion 22A-2 and an area extended slightly upwardly from the rectifying portion 22A-2. In the cell stack 1 formed (FIG. 1), the membranes 5 (FIG. 1) are arranged on both sides of the cell frame 2 (FIG. 1). The protection plate 23 is used for protecting the thin membrane 5 from tear or damage caused by contact with the projections and depressions of the guide groove 22A-1 and rectifying portion 22A-2. Also, the protection plate 23 is made of sufficient size to cover the area extended slightly upwardly from the rectifying portion 22A-1 as well, for the purpose of providing the function as a holder to hold upper and lower end portions of the positive electrode 3 (negative electrode 4) between the protection plate 23 and the bipolar plate 9, to thereby produce improved assembling workability. The protection plate 23 has thickness of the order of about 0.1-0.3 mm. The frame 2A has a recessed portion 24 formed into a corresponding shape to the periphery of the protection plate 23 in the position where the protection plate 23 is mounted (See FIG. 2), thus facilitating the alignment of the protection plate 23.

O-rings to seal the respective manifolds 21A, 21B and O-rings to prevent leakage of the electrolyte to the outside of the cell frames when the cell frames are stacked in layers are fitted in the circular grooves 25 formed around the manifolds and in frame grooves 26 formed along the outer periphery of the cell frame, respectively.

(Electrode)

The positive electrode 3 and the negative electrode are arranged on the front side and the back side of the bipolar plate 9, respectively. Usually, the positive (negative) electrode 3 is formed of the carbon felt and is formed to have a size corresponding to a rectangular space defined in the cell frame. It is usual that the positive (negative) electrode 3 is bonded to the bipolar plate 9 by adhesive, but, in the present invention, the form of the cell stack is held by a clamping force of a clamping mechanism mentioned later without using any adhesive.

The frame 2A has a thickness larger than the bipolar plate 9. As a result, a level difference is produced between a surface of the frame 2A and a surface of the bipolar plate 9. When incorporated in the cell stack, the electrodes are compressed to a thickness corresponding to the level difference. By defining the repulsive force of the electrodes compressed, the battery efficiencies can be improved. As apparently seen from test samples mentioned later, the repulsive force is preferably in the range of more than 15 kPa to less than 150 kPa (more than 0.153 kgf/cm$^2$ to less than 1.53 kgf/cm$^2$). Also, a weight per unit area of the electrode is preferably in the range of 100 g/m$^2$ or more to 1,000 g/m$^2$ or less.

(Membrane)

An ion-exchange membrane is used for the membrane. It has thickness of the order of about 20-400 μm. Vinyl chloride, fluorocarbon resin, polyethylene, polypropylene and the like can be used as material of the membrane. The membrane has an area substantially equal to the cell frame and also has through holes formed in locations confronting the manifolds.

(Electrical Terminal)

The cell stack 1 has electrical terminals 10 disposed in the vicinity of both ends thereof for providing the charge/discharge operation as the redox flow battery. The cell stack 1 is formed by the cell frame 2, the positive electrode 3, the membrane 5, the negative electrode 4 and the cell frame 2 being repeatedly stacked in sequence, as shown in FIG. 1. The bipolar plate fixed in the interior of the cell frame 11 located at each end of the stack body thus formed is put into contact with the electrode 3, 4 located at each end of the stack body, and the electrical terminal 10 is drawn out from the cell frame 11 located at the each end of the stack body.

(Feed and Discharge Plate)

The feed and discharge plates 6 have the structure to connect the electrolyte tanks and the manifolds of the cell frames 2 so as to feed and discharge the electrodes to and from the manifolds. Pipes 12 are fitted in the feed and discharge plates 6 and also are connected to the electrolytic tanks. The pipes 12 are connected to the manifolds of the cell frames 2 through the electrolyte flow channels in the feed and discharge plates 6. In this embodiment, the electrical terminals 10 and the pipes 12 are drawn out in the opposite direction from the cell stack 1 to make a distinction between a power line and a circulation line of the electrolyte, so as to facilitate a connecting work between the electrical terminals 10 and equipment and a connecting work between the pipes 12 and a piping to the tanks. Particularly, this arrangement can provide a desirable result that even when the electrolyte leaks from the pipes 12, the electrical terminals 10 are kept out of the leakage of the electrolyte, thus preventing a flowing of electrical current to the power line.

(End Plate)

Figure 4:
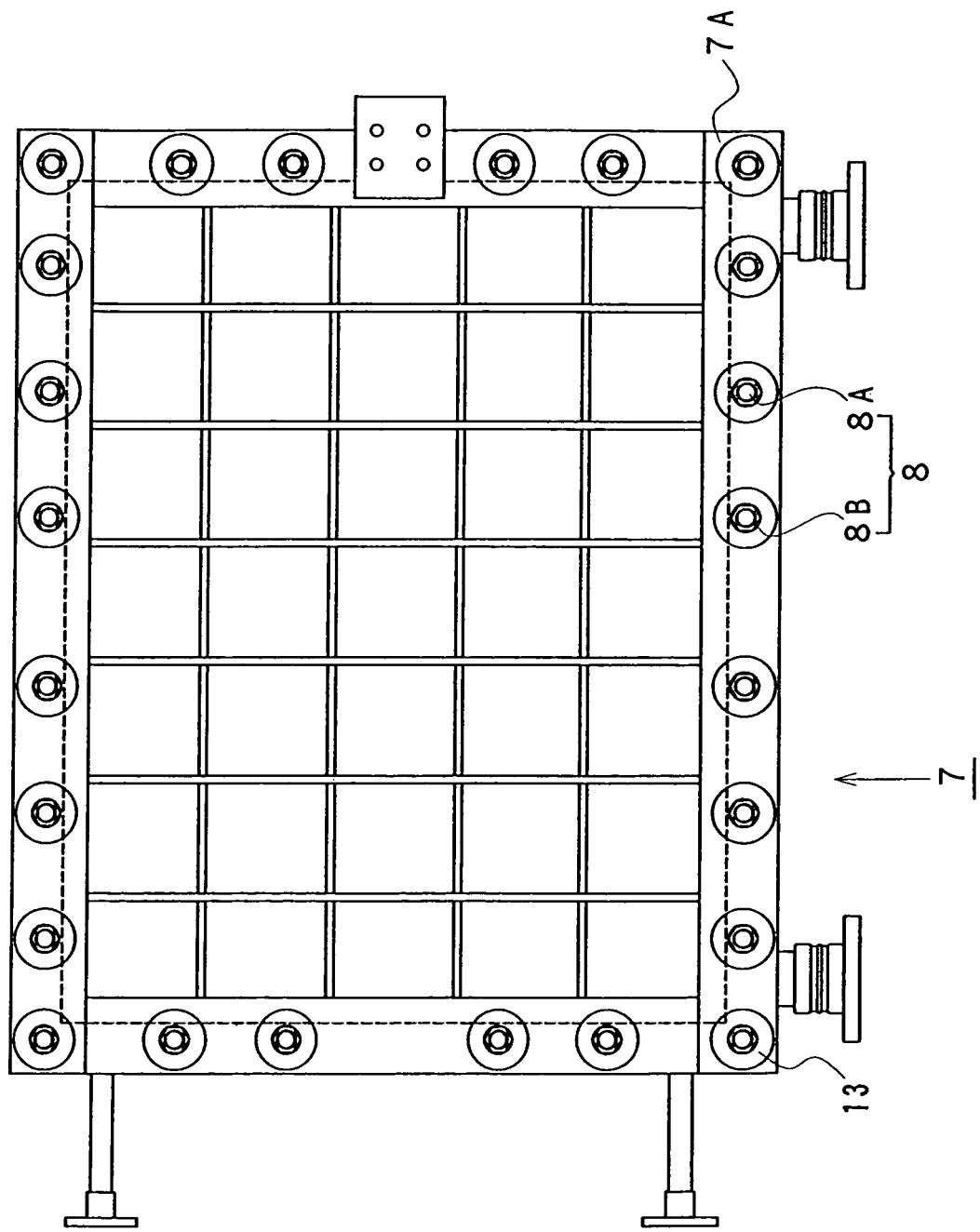
FIG. 4 is a plan view of an end plate.

The end plates 7 are latticed plates for clamping onto both sides of the stack body comprising the cell frames 2, the electrodes 3, 4, the membranes 5 and the feed and discharge plates 6. A plan view of the end plate 7 is shown in FIG. 4. The latticed plates having empty spaces therein is adopted to provide reduction in weight of the end plate 7. The end plates 7 each have a number of through holes formed around a periphery 7A thereof. After rod-like members 8A mentioned later are inserted in the through holes, nuts 8B are tightened, thereby holding the stack structure comprising the cell frames 2, the electrodes 3, 4, the membranes 5 and the feed and discharge plates 6 (See FIG. 1).

(Clamping Mechanism)

The clamping mechanism 8 serves to put the both end plates 7 into press-contact with both sides of the stack body to hold the stack body constructed as the cell stack 1, as shown in FIG. 1. The clamping mechanism 8 comprises the rod-like members 8A inserted in the through holes of the end plates 7 and the nuts 8B screwably engaged with the rod-like members 8A. Each rod-like member 8A has male threads formed at both ends thereof to be threadedly engaged with the nut 8B and an insulating coating formed by a thermal contraction tube at an intermediate portion thereof. When the stack body comprising the cell frames 2 and the electrodes 3, 4 is clamped with the rod-like members 8A, a number of rod-like members 8A are arranged in parallel around the outside of the stack body. Further, in this embodiment, coil springs 13 are disposed around end portions of the rod-like members 8A between the nuts 8B and the end plates 7, to absorb thermal expansion and contraction of the cell stack 1.

(Out-of-Position Preventing Plate)

An out-of-position preventing plate (not shown) is disposed between a lower surface of the stack body of the cell frames 2 and the rod-like members 8A.

The out-of-position preventing plate 14 is disposed between a lower surface of the stack body of the cell frames 2 and the rod-like members 8A. The out-of-position preventing plate 14 serves to prevent part of the cell frames 2 from being moved out of position when some impact is exerted on the cell stack 1 during transportation. No particular limitation is imposed on the material and configuration of the out-of-position preventing plate 14, as long as it can be interposed between the stack body of the cell frames 2 and the rod-like members 8A.

(Prototype 1)

Using the cell stack mentioned above, a prototype of a redox flow battery was produced, and battery performances and discharge possible power of that redox flow battery were measured. Data on material, size, and others of the cell stack and the measurement results are shown below.

<Frame>
Size
Outer size: 1,000 mm wide, 800 mm high, and 5 mm thick,
Inner size: 900 mm wide and 600 mm high,
Frame groove: 3 mm wide, 1 mm deep, and 7.5 mm in distance between grooves,
Level difference between frame and bipolar plate: 3.0 mm,
Material: Resin comprising 50 mass % vinyl chloride and 50 mass % acrylonitrile-butadiene-styrene copolymer (ABS),
Manufacturing process: Injection molding,
<Bipolar Plate>
Size: 0.3 mm thick,
Material: 50 mass % graphite-containing chlorinated polyethylene,
<Electrode>
Material: Carbon felt,
Repulsive force: 100 kPa (1.0 kgf/cm$^2$),
Weight per unit area: 500 g/m$^2$,
<Stack structure>
Total number of cell frames: 100 in total (A set of stack body with 25 cell frames stacked in layers is temporarily held, and four sets of stack bodies, each being temporarily held, are stacked in layers),
<Electrolyte>
Composition: Vanadium ion concentration: 2.0 mol/L, Free sulfuric acid concentration: 2.0 mol/L, and Added phosphoric acid concentration: 0.3 mol/L,
Quantity of electrolyte: 20 m$^3$,
<Clamping Mechanism>
Number of rod-like members: 20,
Rate of spring of coil spring: 1,000 N/m,
Active coils: 3.0,
Contraction from free length of coil spring when clamped: 30 mm,
<Results>
Battery efficiency: 86%,
Discharge possible power: 350 kWH,
Others: It was found that even when the cell stack was thermally contracted during operation, no problem occurred and no leakage of electrolyte from between the cell frames occurred, either.

(Prototype 2)

Except the changes in repulsive force and weight per unit area of the electrode, the same redox flaw battery system as that of Prototype 1 was produced, and the cell resistances (Ω·cm$^2$) of the batteries and the state of circulation of the electrolytes were examined. The repulsive force and weight per unit area of the electrodes prepared herein and test results are shown in TABLE 1.

TABLE 1

|  | Repulsive force (kPa) | Wight per unit area (g/m$^2$) | Cell resistance (Ω·cm$^2$) | | State of Circulation |
| --- | --- | --- | --- | --- | --- |
| No. 1 | 15 | 90 | 3.10 | X | Excellent |
| No. 2 | 25 | 100 | 1.48 | ◯ | Excellent |
| No. 3 | 40 | 250 | 1.21 | ◎ | Excellent |
| No. 4 | 83 | 300 | 1.13 | ◎ | Excellent |
| No. 5 | 90 | 350 | 1.02 | ◎ | Excellent |
| No. 6 | 96 | 610 | 0.97 | ◎ | Excellent |
| No. 7 | 100 | 800 | 1.10 | ◎ | Excellent |
| No. 8 | 120 | 1,000 | 1.41 | ◯ | Good |
| No. 9 | 150 | 1,200 | 1.81 | X | Uneven |

◎: Excellent
◯: Good
X: No-good

It is apparently found from TALBE 1 that when the repulsive force is set to be in the range of more than 15 kPa to less than 150 kPa (more than 0.153 kgf/cm² to less than 1.53 kgf/cm²) and the weight per unit area is set to be in the range of 100 g/m² or more to less than 1,200 g/m², or preferably 1,000 g/m² or less, the cell resistance is reduced to 1.5 Ω·cm² or less and also the electrolyte is circulated without any problem. It also found from TALBE 1 that when the repulsive force is set to be in the range of 40 kPa or more to 100 kPa or less (0.408 kgf/cm² or more to 1.02 kgf/cm² or less) and the weight per unit area is set to be in the range of 250 g/m² or more to 800 g/m² or less, the cell resistance can be reduced to 1.3 Ω·cm² or less, these ranges being found to be further preferable.

Capabilities of Exploitation in Industry

As described above, the cell stack of the present invention is designed to hold the stack structure by a clamping force without adhesively bonding the bipolar plate to the electrodes. This can eliminate the adhesive bonding process of the bipolar plate and electrodes, thus achieving simplification of assembly processes. Also, the elimination of the adhesive bonding process can also eliminate the problem of deterioration in battery efficiency with deterioration of adhesive.

The invention claimed is:

1. A redox flow battery including a stack body in which a cell frame, electrodes and a membrane are stacked in layers, the redox flow battery comprising:
    end plates arranged at both ends of the stack body; and
    a holding member including a clamping mechanism for holding the stack body in sandwich relation between the both end plates, wherein
    the cell frame comprises a frame and a bipolar plate integrated with the frame,
    the electrodes are put into close contact with the bipolar plate by a clamping force of the clamping mechanism without using adhesive,
    the clamping mechanism comprises rod-like members used for holding the stack body in sandwich relation between the end plates,
    the rod-like members are provided on outside of the stack body,
    the holding member further includes an out-of-position preventing plate of the cell frame interposed between the stack body and the rod-like members to prevent at least a part of cell frames from being moved out of position,
    at least a surface of the out-of-position preventing plate comprising an insulating material,
    a manifold is formed on the frame of the cell frame,
    the frame has an circulation portion comprising an electrolyte guide groove extending from the manifold and a rectifying portion for allowing the electrolyte fed from the guide groove to diffuse along an edge of the electrodes, and
    the cell frame has a protection plate that covers the guide groove and the rectifying portion.

2. The redox flow battery according to claim 1, wherein when the electrodes are compressed to thickness corresponding to a level difference between the frame and the bipolar plate, repulsive force of the electrodes is in the range of more than 15kPa to less than 150kPa (more than 0.153kgf/cm² to less than 1.53kgf/cm²).

3. The redox flow battery according to claim 1, wherein the electrodes each have a weight per unit area of 100g/m² or more to less than 1,200g/m².

4. The redox flow battery according to claim 1, wherein the rod-like members are each provided with insulating coating.

5. The redox flow battery according to claim 1, wherein the clamping mechanism includes elastic members for absorbing expansion and contraction of the stack body in a linear direction thereof.

6. The redox flow battery according to claim 1, wherein in the stack body further including:
    feed and discharge plates including pipes to feed and discharge electrolytes to and from the electrodes; and
    electrical terminals to charge and discharge electricity to and from the stack body,
    the electrical terminals and the pipes being arranged in the opposite direction from the stack body.

7. The redox flow battery according to claim 1, wherein the out-of-position preventing plate has a thickness to be fit between the stack body and the rod-like members.

8. The redox flow battery according to claim 1, wherein the end plates are in the form of a latticed plate having empty spaces therein.

9. The redox flow battery according to claim 1, wherein the out-of-position preventing plate is provided at a lower surface of the stack body.

* * * * *